United States Patent
Lannutti (10) Patent No.: US 8,277,348 B2
(45) Date of Patent: Oct. 2, 2012

(54) CLUTCHED DAMPER FOR A BELT TENSIONER

(75) Inventor: Anthony E. Lannutti, Fayetteville, AR (US)

(73) Assignee: Dayco Products, LLC, Tulsa, OK (US)

( * ) Notice: Subject to any disclaimer, the term of this patent is extended or adjusted under 35 U.S.C. 154(b) by 0 days.

(21) Appl. No.: 13/208,012

(22) Filed: Aug. 11, 2011

(65) Prior Publication Data

US 2011/0300976 A1 Dec. 8, 2011

Related U.S. Application Data

(62) Division of application No. 12/265,268, filed on Nov. 5, 2008.

(51) Int. Cl.
*F16H 7/12* (2006.01)
(52) U.S. Cl. ........................ 474/135
(58) Field of Classification Search ............ 474/135
See application file for complete search history.

(56) References Cited

U.S. PATENT DOCUMENTS

| | | | |
|---|---|---|---|
| 4,270,906 A | 6/1981 | Kraft et al. | |
| 4,583,962 A | 4/1986 | Bytzek et al. | |
| 4,596,538 A | 6/1986 | Henderson | |
| 4,826,471 A | 5/1989 | Ushio | |
| 4,832,665 A | 5/1989 | Kadota et al. | |
| 5,149,306 A | 9/1992 | Sidwell et al. | |
| 5,250,009 A * | 10/1993 | Sidwell et al. | 474/135 |
| 5,277,667 A | 1/1994 | Gardner et al. | |
| 5,558,370 A | 9/1996 | Behr | |
| 5,598,913 A | 2/1997 | Monahan et al. | |
| 5,632,697 A | 5/1997 | Serkh | |
| 5,718,649 A | 2/1998 | Hong et al. | |
| 5,795,257 A * | 8/1998 | Giese et al. | 474/109 |
| 6,231,465 B1 | 5/2001 | Quintus | |
| 6,375,588 B1 | 4/2002 | Frankowski et al. | |
| 6,422,962 B1 | 7/2002 | Lehtovaara et al. | |

(Continued)

FOREIGN PATENT DOCUMENTS

WO 2004/109247 12/2004

OTHER PUBLICATIONS

PCT, International Search Report and Written Opinion, International Application No. PCT/US2009/063428 (Dec. 30, 2009).

(Continued)

*Primary Examiner* — William E Dondero
*Assistant Examiner* — Michael Riegelman
(74) *Attorney, Agent, or Firm* — Thompon Hine LLP (57) ABSTRACT

A tensioner including a support structure defining a pivot axis, an arm coupled to the support structure for rotation about the pivot axis, and a damping mechanism. The arm includes a cup having the damping mechanism seated therein. The damping mechanism includes a first tensioner component that is generally cup-shaped and has first ramp features on the rim thereof, a second tensioner component having second ramp features, and a damper spring coupling the first tensioner component to the second tensioner component. The first tensioner component is rotatable with the arm and the second tensioner component is non-rotatable. The damper mechanism has the first ramp features aligned with the second ramp features and rotation of the first tensioner component in a first direction moves the first ramp features relative to the second ramp features and translates the first tensioner component into damping engagement with the arm.

20 Claims, 6 Drawing Sheets

U.S. PATENT DOCUMENTS

| | | |
|---|---|---|
| 6,478,118 B2 | 11/2002 | Astrom et al. |
| 6,554,318 B2 | 4/2003 | Kohut et al. |
| 6,582,332 B2 | 6/2003 | Serkh |
| 6,834,631 B1 | 12/2004 | Blackburn et al. |
| 6,863,631 B2 * | 3/2005 | Meckstroth et al. ........... 474/135 |
| 7,448,974 B2 * | 11/2008 | Crist et al. .................... 474/133 |
| 7,497,794 B2 * | 3/2009 | Lannutti et al. ............... 474/135 |
| 2002/0119850 A1 * | 8/2002 | Dutil ............................ 474/135 |
| 2003/0008739 A1 | 1/2003 | Asbeck et al. |
| 2003/0153421 A1 | 8/2003 | Liu |
| 2003/0153422 A1 * | 8/2003 | Quintus ........................ 474/135 |
| 2003/0216204 A1 | 11/2003 | Serkh et al. |
| 2005/0043130 A1 * | 2/2005 | Hao et al. ...................... 474/135 |
| 2005/0059518 A1 * | 3/2005 | Joslyn ........................... 474/135 |
| 2006/0293135 A1 | 12/2006 | Quintus et al. |
| 2008/0058142 A1 * | 3/2008 | Joslyn ........................... 474/135 |

OTHER PUBLICATIONS

PCT, International Preliminary Report on Patentability, International Application No. PCT/US2009/063428 (May 19, 2011).

* cited by examiner

CLUTCHED DAMPER FOR A BELT TENSIONER

RELATED APPLICATION

This application is a divisional of application Ser. No. 12/265,268 filed Nov. 5, 2008.

TECHNICAL FIELD

The present invention relates generally to tensioners and more particularly to an asymmetrically damped tensioner utilizing a ramp-ramp clutch assembly operatively engaged with the tensioner arm.

BACKGROUND

It is common for a belt tensioner to have a means to dampen movement of the tensioner arm caused by belt tension fluctuation. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occur as a result of manufacturing variation, operating temperature and component break-in or wear can also cause the tensioner to be unresponsive.

Timing belt systems have benefited from the use of asymmetric damping to address this problem. An asymmetrically damped tensioner provides damping when additional belt tension is encountered but is free to respond to slack belt conditions. Although asymmetric functionality may not be required for all other front end accessory drive tensioners, the potential for increased service life, solving other transient dynamic system problems including belt slip during a 1-2 gear shift, or simply making the tensioner less sensitive to damping variation make it a desirable design option.

One current solution to this problem uses a viscous linear damper mechanism, such as a shock absorber, attached to a pivoting arm. Asymmetric damping is achieved through, for example, check valves and different orifice sizes in the shock absorber. This solution, however, tends to be expensive and requires more packaging space than a conventional tensioner. Other solutions use wedges that increase damper friction during wind-up or spring loaded self-energizing brake shoe elements. These designs, however, tend to be complex with many small parts to assemble.

One-way clutch mechanisms have been proposed, for example in U.S. Pat. Nos. 4,583,962 and 6,422,962, for timing belt tensioners for the purpose of preventing or limiting back travel to prevent tooth jump. These "ratcheting" tensioners, however, lack the ability to relieve belt tension sufficiently when not required. Other timing belt tensioner proposals including, for example, U.S. Pat. Nos. 4,832,665 and 6,375,588, use a one-way device coupled to a viscous damper. Although these devices offer good functionality, retention of the viscous fluid throughout the service life can be difficult. Yet another design disclosed in U.S. Patent App. Publication 2003/0008739 uses friction generated by the clamping action of a wrap spring clutch to provide damping.

The aforementioned tensioner designs are not ideal. Accordingly, a new tensioner design is desired.

SUMMARY

One aspect of the invention is a belt tensioner including a ramp-ramp assembly. In one embodiment, the tensioner includes a tensioner axle defining a pivot axis, an arm mounted on the tensioner axle so as to permit the arm to pivot about the pivot axis, a first tensioner component having first ramp features, a second tensioner component having second ramp features, and a ramp bushing having an upper ramp surface and a lower ramp surface. The first tensioner component is engaged to the arm for rotation therewith and the second tensioner component is coupled to the tensioner axle. The ramp bushing is disposed between the first tensioner component and the second tensioner component such that the upper ramp surface seats within the first ramp features and the lower ramp surface seats within the second ramp features.

In another embodiment, the tensioner includes a tensioner axle defining a pivot axis, an arm pivotable about the pivot axis in a first direction and a second direction, a spring case pivotable about the pivot axis and engaged to the arm for rotation therewith, and an end cap coupled to the spring case. The spring case includes first ramp features and the end cap includes second ramp features. The tensioner includes a ramp bushing disposed between the spring case and the end cap. The ramp bushing has a spring case side having a first ramp surface that seats within the first ramp features and an end cap side having a second ramp surface that seats within the second ramp features. The tensioner also includes a torsional spring disposed within the spring case. The torsional spring is coupled to the arm such that the spring winds up when the arm pivots about the pivot axis in a first direction and unwinds when the arm pivots about the pivot axis in a second direction to provide asymmetric dampening.

In another embodiment, the tensioner includes a tensioner axle defining a pivot axis, an arm mounted on the tensioner axle so as to permit the arm to pivot about the pivot axis, and a clutch assembly mounted at least partially to the tensioner axle and coupled to the arm. The clutch assembly comprises a first tensioner component having first ramp features, a second tensioner component having second ramp features, a flatwire spring having a first end and a second end, and a damper bushing coupled to the first tensioner component. The first tensioner component is engaged with the arm to rotate therewith and the second tensioner component is coupled to the tensioner axle. The first end of the flatwire spring is coupled to the first tensioner component and the damper bushing is positioned for frictional contact with the arm such that when the arm experiences wind-up the spring case rotates with the arm and moves up the second ramp features of the second tensioner component which pushes the damper bushing against the arm for frictional damping.

DETAILED DESCRIPTION

The tensioner disclosed herein provides an asymmetric frictional damper that will activate during a wind-up (i.e. untensioning) to mitigate the deleterious effects of wind-up. Wind-up results when increasing belt tension causes the belt to lift the tensioner arm in a direction away from the belt. To mitigate the negative effects of wind up, it is desirable to have a frictional damper on the tensioner arm that will resist the lifting of the tensioner arm from the belt without adversely effecting movement of the tensioner arm toward the belt. This kind of frictional damping operating to resist lifting of the tensioner arm only is generally known as asymmetric damping.

The tensioner disclosed herein achieves asymmetric damping in part by using a brake element, which may be referred to herein as a ramp-ramp assembly. The ramp-ramp assembly may be comprised of at least two tensioner components having ramp features that interface with each other. The ramp-ramp assembly may also include a ramp bushing.

At least one of the tensioner components having a ramp feature is moveable such that one-way or asymmetric frictional damping is provided to oppose the movement of the tensioner arm when the arm begins to move away from the belt. The moveable component enables the device to apply progressively more frictional damping to counteract the lifting of the tensioner arm from the belt the further the tensioner arm is lifted. The ability to progressively increase frictional damping relative to displacement of the tensioner arm enables the device to provide greater frictional damping in response to greater displacements of the tensioner arm away from the belt. This creates a feedback loop to combat the deleterious effects of wind-up; the more the tensioner arm is driven away from the tensioned belt, the more frictional damping is applied to stop the wind-up. The asymmetric damping may be tailored such that it will not restrict all movement in the wind-up direction thereby providing additional compliance that is advantageous for some applications. Since the damping is asymmetric in nature by design, as the tensioner returns to normal operation—whereby the tensioner arm returns back to a tensioning contact with the belt—the amount of frictional damping applied to the motion of the device in the tensioning direction is less than that applied during wind-up.

Figure 1:
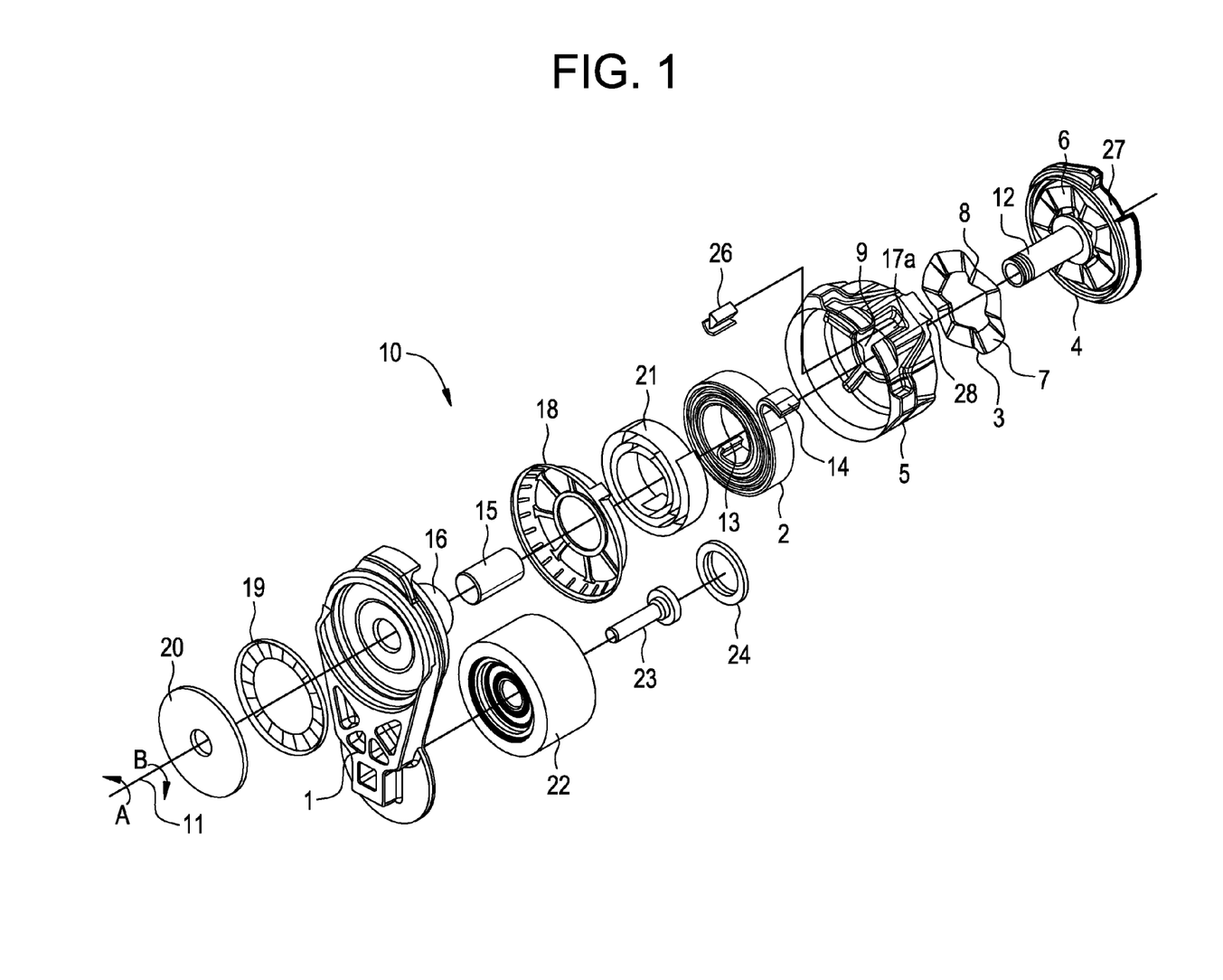
FIG. 1 is an exploded perspective view of an embodiment of a tensioner including a ramp-ramp assembly.
Figure 2:
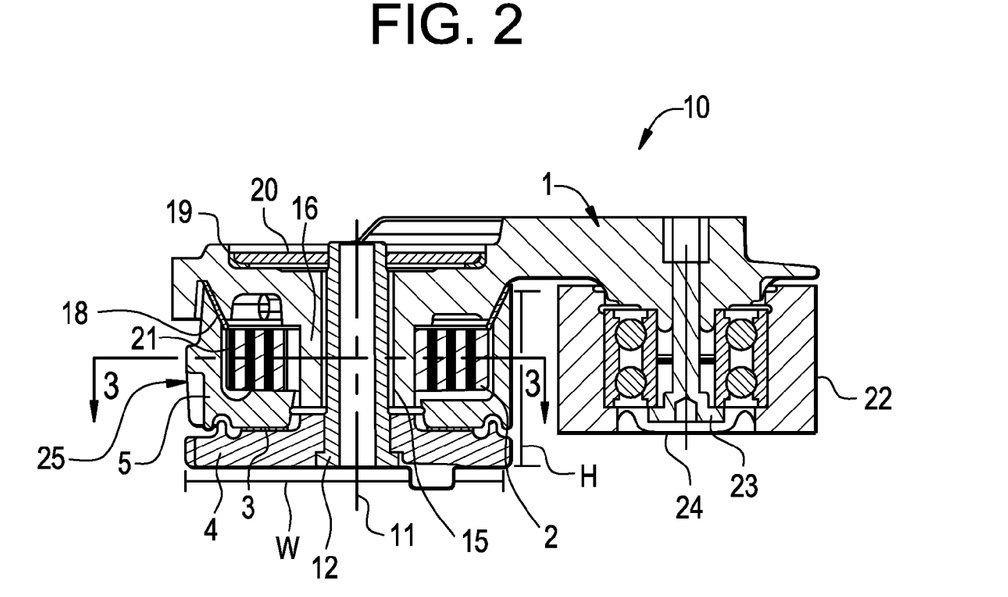
FIG. 2 is a side, cross-sectional view of the assembled tensioner of FIG. 1.

Referring now to the embodiment shown in FIGS. 1 and 2, the tensioner 10 includes an arm 1, a tensioner axle 12 defining a pivot axis 11, a first tensioner component 5 having a first set of ramp features 9, a second tensioner component 4 having a second set of ramp features 6, and a ramp bushing 3. The tensioner axle 12 is substantially coaxial with the pivot axis 11 and the arm 1 is mounted on the tensioner axle 12 so as to permit the arm 1 to pivot about the pivot axis 11.

The first tensioner component 5 may be coupled to the arm 1 to pivot therewith. Additionally, the first tensioner component 5 may house a torsional spring 2, and thus may be a spring case. Alternately, one skilled in the art will appreciate that the first tensioner component may be any other component of the tensioner that has a first set of ramp features and is coupled to the arm 1 so that the component pivots when the arm 1 pivots about the pivot axis 11. Referring to the embodiment of FIG. 1, the second tensioner component 4 may be coupled to the tensioner axle 12, and may be an end cap that at least partially closes the tensioner. Alternately, one skilled in the art will appreciate that the second tensioner component 4 is not limited to the end cap, but may be any other component of the tensioner having a second set of ramp features. The ramp bushing 3, if present, may be disposed between the first tensioner component 5 and the second tensioner component 4. The ramp bushing 3 includes an upper ramp surface 7 and a lower ramp surface 8. The upper ramp surface 7 seats within the first set of ramp features 9 on the first tensioner component 5. The lower ramp surface 8 seats within the second set of ramp features 6 on the second tensioner component 4. The use of the ramp bushing 3 is advantageous in that it provides a lower coefficient of friction between the ramp features 6 and 9 and can prevent the ramp features 6 and 9 from wearing grooves into one another. The bushing also provides a more stable coefficient of friction between the two surfaces thereby maintaining a more consistent asymmetry ratio throughout the life of the tensioner.

The arm 1 may be mounted over the tensioner axle 12 so as to pivot about axis 11. The distal end of the arm 1, opposite the pivot axis 11, may be configured to receive a belt-contacting pulley 22. The pulley may be mounted on the distal end of the tensioner arm 1 by a bolt 23 or other fastener known to one of skill in the art and may include a cover 24. The torsional spring 2 exerts a force on the arm 1 to bias the pulley 22 in the direction A to tension a belt. Wind-up of the tensioner in the opposite direction B is resisted by bias of the torsional spring 2 augmented by the asymmetric frictional damping mechanism. The asymmetric frictional damping does not substantially impede movement of the arm in direction A while substantially limiting movement of the arm in direction B through the application of progressively greater frictional damping as the tensioner arm is further displaced.

The second tensioner component 4, which may be an end cap provides means for affixing the tensioner to an engine or device. Multiple methods of affixing a tensioner relative to a belt to be tensioned are well known in the art including, but not limited to, the use of welds, bolts, screws, and locking structures. Alternatively, the tensioner may be mounted to the engine or device on the opposite side of the tensioner arm from the end cap using an axle passing through the tensioner along the pivot axis. Regardless of the method of mounting the device to the engine or device, the approaches taken to create the asymmetric forces to combat wind-up are substantially unchanged.

Referring to the embodiment shown in FIGS. 1 and 2, the tensioner axle 12 provides a bearing surface that enables both rotational and translational movement of components in the tensioner 10. Translational motion is substantially parallel to and along the pivot axis 11. The ramp features 6 of the second tensioner component 4 are formed on its interior surface facing the tensioner arm and are arrayed substantially circumferentially around the tensioner axle 12.

The second tensioner component 4, including the ramp features 6, tensioner axle 12 and other elements can be fabricated as a single unit using a variety of techniques including forging, casting, die-casting, sintering, or machining or fabricated in different components and then joined together using a variety of methods such as sintering, welding, bonding, bolting, and even interference fits. In an alternative embodiment, for example, the ramp features 6 can be formed as a separate plate that may be integrated with the second tensioner component 4. By fabricating the individual elements as separate components it may be easier to provide specific surface or heat treatments or coatings to a component separate from the entire integrated unit.

Still referring to the embodiment in FIG. 1, the tensioner 10 includes a ramp bushing 3 having an upper ramp surface 7 and a lower ramp surface 8 opposite the first side. The ramp bushing 3 is both rotatable about and translatable along the pivot axis 11 within the tensioner 10. The ramp bushing 3 interfaces with the second tensioner component 4 via the lower ramp surface 8 of the ramp bushing 3 which seats within the ramp features 6 of the second tensioner component 4. The lower ramp surface 8 has the opposite feature profile of the upper ramp surface 7 which interfaces with the ramp features 9 located on the tensioner component 5.

Figure 3:
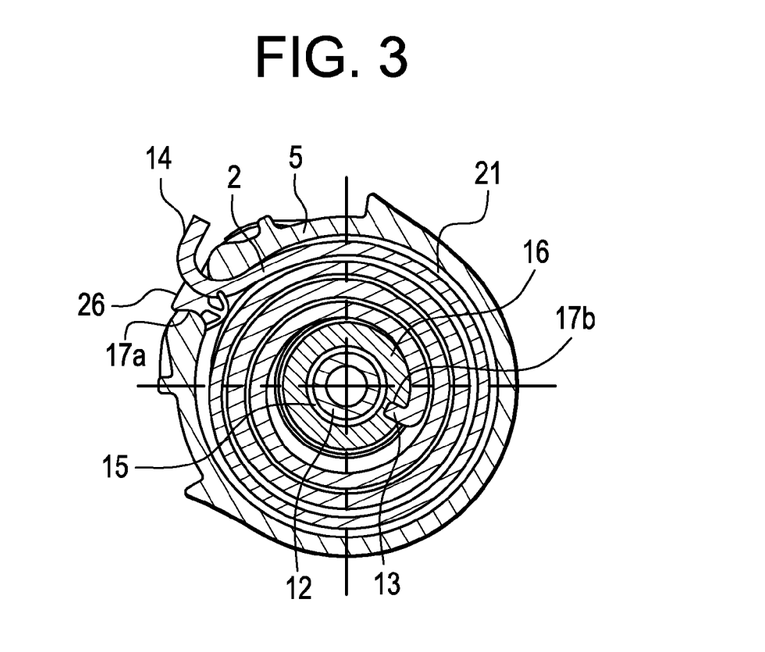
FIG. 3 is a plan view, in section, along line 3-3 in FIG. 2.

The tensioner component 5 houses a torsional spring 2 or other components of the tensioner. The torsional spring 2 may be a coil spring, a round wire spring, a flatwire spring, or other spring types known to one of skill in the art. As shown in FIGS. 1 and 3, an outer tang 14 of torsional spring 2 engages the tensioner component 5 at a first spring engagement point 17a. The first spring engagement point 17a may be sized to suitably accept both the spring tang 14 and a plug 26, which may be deformable. An inner tang 13 of spring 2 engages the tensioner arm 1 at a second spring engagement point 17b along the arm arbor 16.

The spring 2 provides a torsional force to bias the tensioner arm 1 into the belt being tensioned to tension the belt during normal operations. The spring 2 also provides an opposing torsional force to urge the ramp bushing 3 to rotate in the opposite direction from the tensioner arm 1. The force imposed on the first tensioner component 5 by the spring 2 causes the first tensioner component 5 to move up the ramp features of either the ramp bushing 3 or the second tensioner component 4 an equilibrium state is reached.

If the torsional spring 2 is a flatwire spring, spring tape 21 may be positioned between the coils of the flatwire spring as shown in FIGS. 1-3. The spring tape 21 may be coiled in a juxtaposed position with the flatwire spring 2, such that the spring tape 21 is between the coils of the flatwire spring and may also be between the flatwire spring 2 and the interior walls of the tensioner component that houses the spring. The use of spring tape 21 reduces frictional wear of the spring or other negative effects of friction such that spring collapse is reduced.

The tensioner 10, as shown in FIGS. 1 and 2, may also include a damper bushing 18, and a pivot bushing 15. The pivot bushing 15 is a substantially cylindrical structure that is inserted into the arm arbor 16 of the tensioner arm 1 that is substantially aligned with the pivot axis 11. The pivot bushing 15 provides a bearing surface for the rotation and translation of elements of the tensioner 10 along and about the pivot axis 11. The damper bushing 18 may act as a cover for the tensioner component 5 to dampen sound and/or vibration and to contain the spring 2 within the tensioner component 5 when it houses the spring 2. The tensioner 10 may also include an arm plate bushing 19 and an arm plate 20 connected to the tensioner arm 1. An end nut, bolt, or fastener may hold the tensioner 10 together along the pivot axis when assembled as shown in FIG. 2. The end nut bolt or fastener may also attach or affix the tensioner 10 to an engine or device as discussed above.

The tensioner 10, as shown in FIG. 1, may include a tab and notch for assembling the second tensioner component 4 and the first tensioner component 5. The second tensioner component 4, as shown in this embodiment, includes a notch 27 in its periphery and the first tensioner component 5 includes a tab 28 that extends toward the second tensioner component 4 and is receivable in notch 27. The notch 27 is larger than tab 28 such that the notch 27 does not act as a stop to inhibit rotational motion of the arm during wind-up. In other words, notch 27 is large enough to provide the amount of rotational motion of the tensioner arm 1 pre-selected to reach the maximum amount of frictional damping the tensioner is to provide. Alternately, however, the notch 27 may act as a stop in the direction opposite of the wind-up if the belt breaks. If the belt breaks, the notch 27 would stop the first tensioner component 5 once it moved back down the ramp and would keep the first tensioner component 5 from moving up the adjacent ramp up in the direction opposite of the wind-up.

Figure 4:
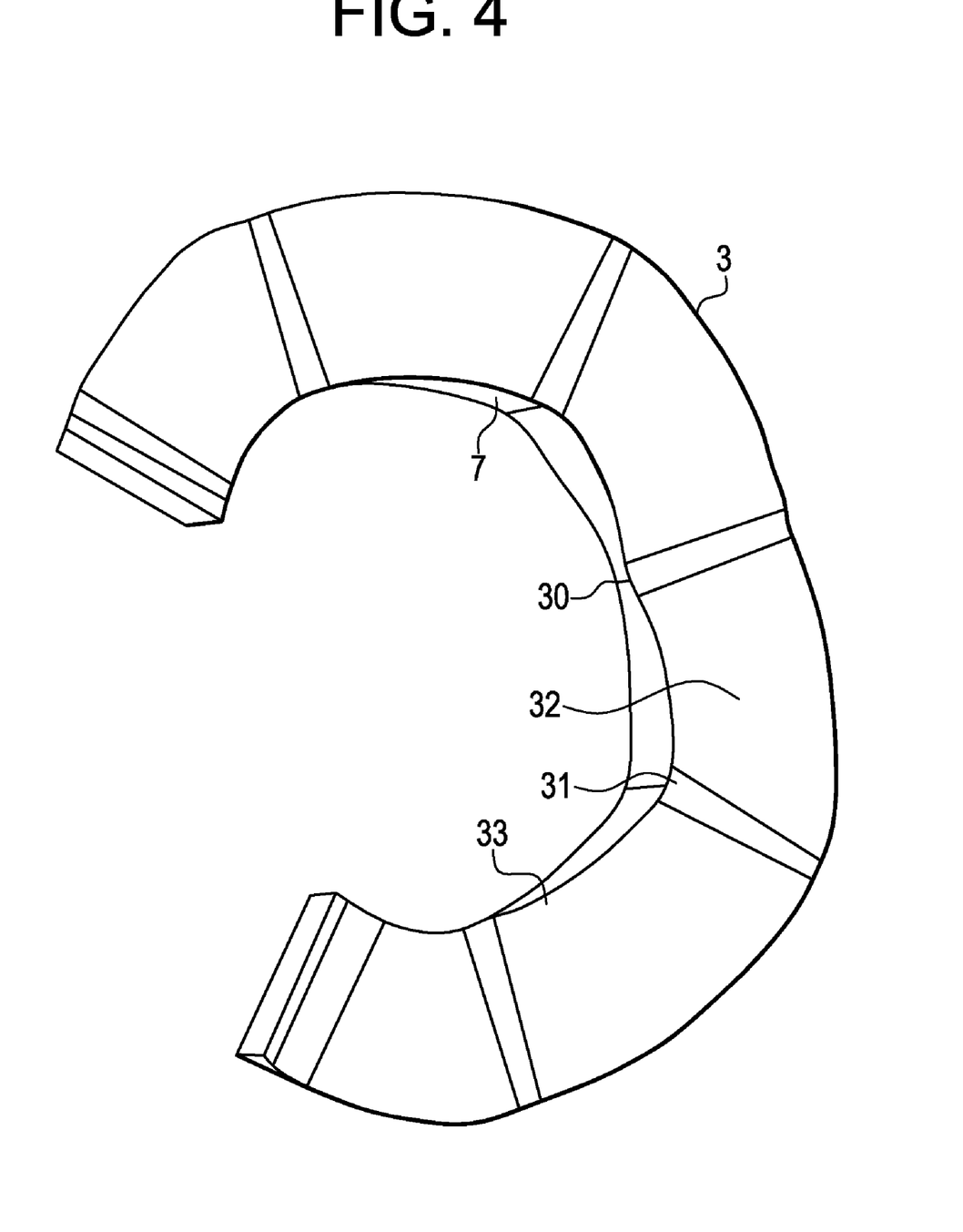
FIG. 4 is a rear cut away, perspective view of the ramp bushing in FIG. 1.

Referring now to FIG. 4, the upper ramp surface 7 of the ramp bushing 3 has ramp features arranged in a substantially circular array around the pivot axis 11. The ramp features 6 of the second tensioner component 4, the tensioner component 5, and the lower ramp surface 8 of the ramp bushing 3 may also be arranged similarly. The upper ramp surface 7 and ramp features 9 of the tensioner component 5 are designed to be in contact during normal operation of the tensioner 10. Likewise, the lower ramp surface 8 and the ramp features 6 of the second tensioner component 4 are designed to be in contact during normal operation of the tensioner 10. The ramp features depicted in FIG. 4 show a substantially symmetric pattern whereby each discrete repeating ramp element has substantially the same pattern up and down. The ramp features may vary in the radial direction from the pivot axis in order to maintain a constant interface with the mating surface and modulate specific properties of the damper during operation. Although the upper ramp surface 7 of the ramp bushing 3 shows a symmetrical repeating pattern, the ramp features can have a unique or alternatively an asymmetric pattern to achieve specific operational characteristics. The general structure of an arbitrary section of ramp features on both the upper and lower ramp surfaces 7, 8 of the ramp bushing 3, the second tensioner component 4, and the tensioner component 5 can be broken into four repeating elements. These elements are lower dwell 30, ramp-up 32, upper dwell 31, and ramp-down 33, as shown in FIG. 4.

Figure 5A:
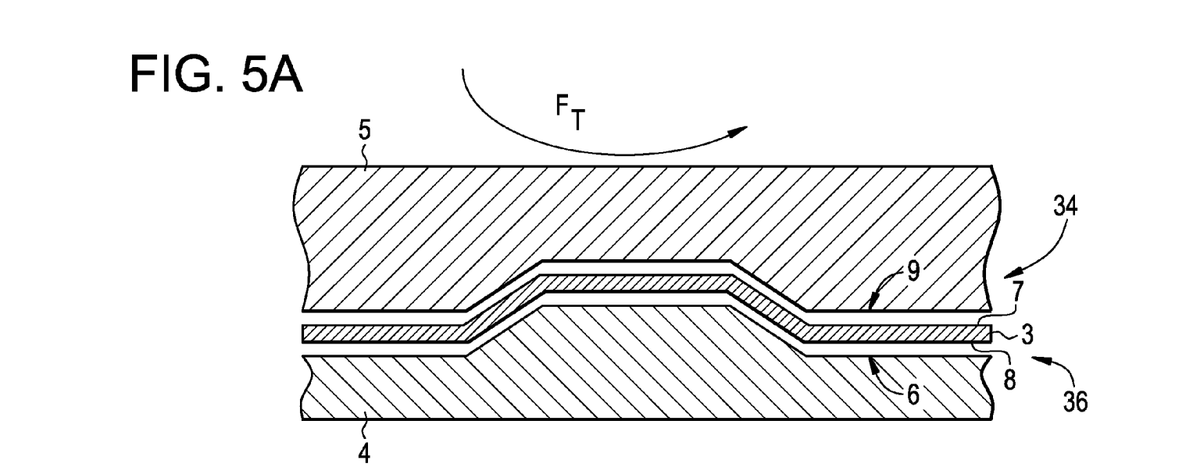
FIGS. 5A-5C are schematic views depicting the interface between the first tensioner component, a ramp bushing, and a second tensioner component according to one embodiment.
Figure 5B:
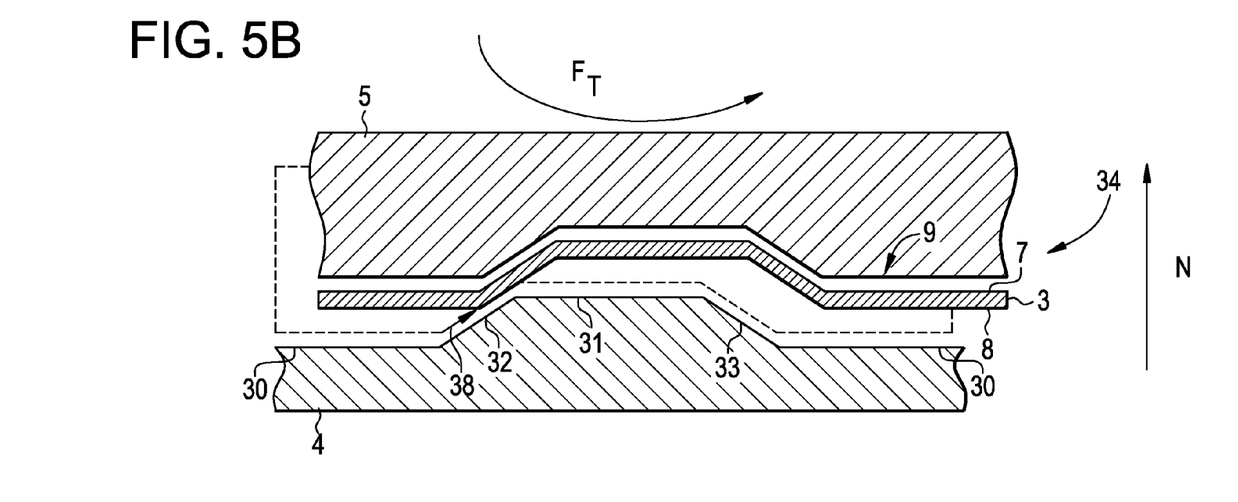
Figure 5C:
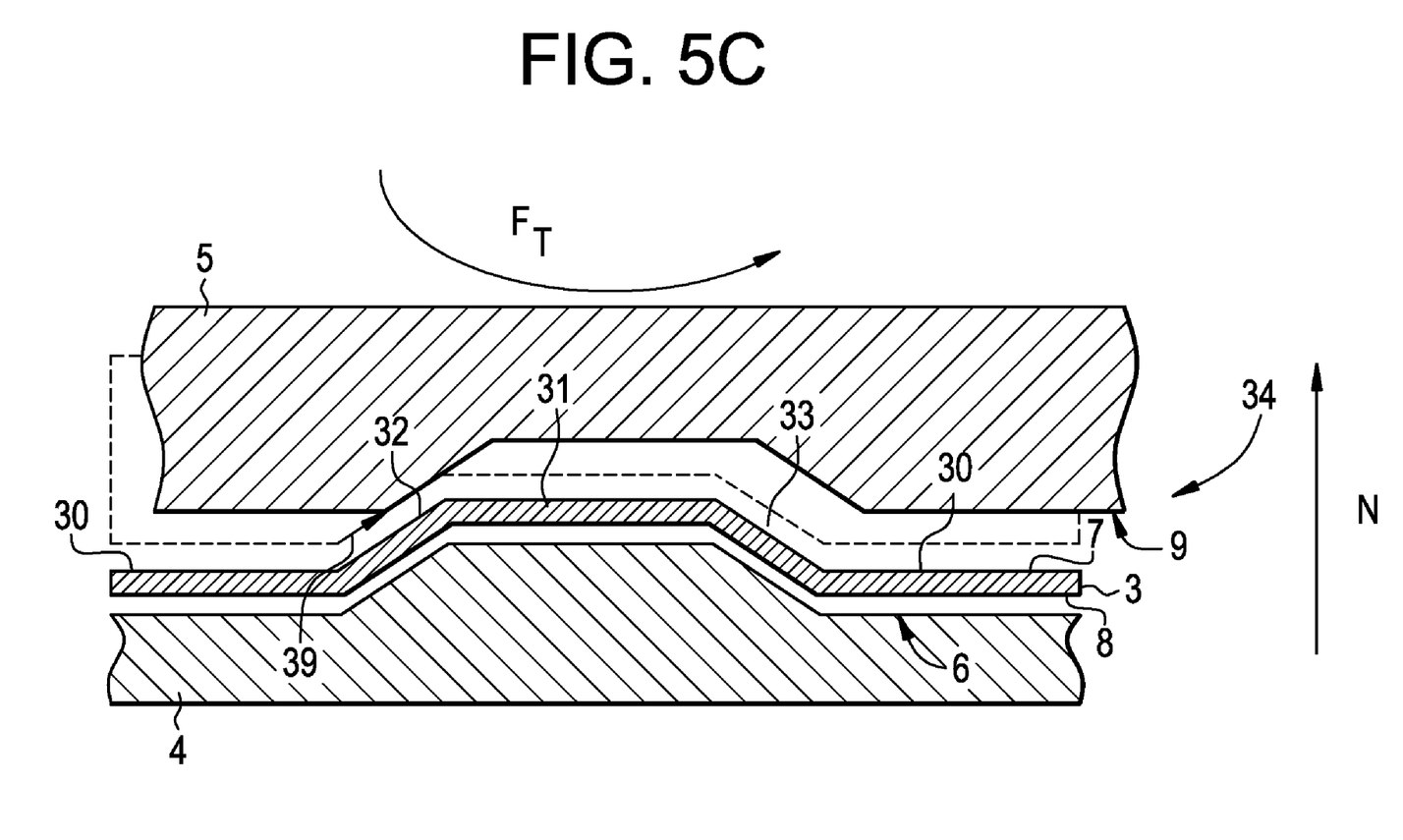

A schematic detail view of the ramp bushing 3 positioned between the first tensioner component 5 and the second tensioner component 4 is shown in FIG. 5A as contact region 34. The lower dwell 30, ramp-up 32, upper dwell 31, and ramp-down 33 are shown for the second tensioner component 4 in FIG. 5B and for the ramp bushing in FIG. 5C. Although the contact region 34 shown in FIG. 5A details a set of straight-line features, two important points must be recognized. First, in the radial direction away from the axis of rotation of the device, the actual ramp profiles may vary significantly along this reference line in order to minimize relative slipping, reduce friction, provide balanced loading, and achieve other objectives. An example of one embodiment of this approach can be seen in the isometric profile shown in FIG. 4 where the same lower dwell 30, ramp-up 32, upper dwell 31, and ramp-down 33 surface features are depicted. Second, although the profiles shown in FIGS. 5A-5C are straight lines, the device can use any number of alternative profiles for the ramps including multi-faceted or curvilinear forms. For example, the upper and lower dwells 31 and 30 respectively could be merely fillets or radius connecting the upward and downward ramps, similar to the embodiment shown in FIG. 4.

Alternatively the dwells 30, 31 and ramps 32, 33 could be constructed in such a way as to provide a detent or delay in switching between normal operation and the asymmetric damping needed during a wind-up situation. The shape of the ramp features (up and down and dwells) may be selected from a wide variety of profiles with a wide range of rectilinear and curvilinear shapes. The ramp features may be repeated at any arbitrary interval over the length of the ramp feature or be unique with no repeating pattern whatsoever. Although the embodiment depicted here has a symmetric repeating profile, where each edge of a specific ramp feature has equivalent features on each side, it is also possible to use an asymmetric profile. The asymmetric profile can at the extreme resemble a saw-tooth configuration, where the areas of the ramp features not in contact are typified by a sharp drop rather then a gradual ramp-down. The number of ramp features, as defined as a single unit may be selected from a wide range of possible alternative arrangements. Preferably the number of ramp feature units is equal to or more than four. More preferably the number of ramp features is equal to or more than six. Most preferably the number of ramp features is equal to or greater than eight.

Referring to FIGS. 5A-5C, a contact region 34 is shown between the second tensioner component 4 having ramp features 6 and the first tensioner component 5 having ramp features 9. The contact region 34, as shown, also includes a ramp bushing 3 having an upper ramp surface 7 and a lower ramp surface 8 positioned between the first tensioner component 5 and the second tensioner component 4. FIG. 5A shows the first tensioner component 5 seated in a down-ramp position 36. During a wind-up condition (i.e., the tensioner arm is moving away from the belt), the rotation of the tensioner arm provides a torsional force that can move the tensioner components 4, 5 relative to one another such that one component moves up the ramp-up 32 of the other. The movement of a component up a ramp creates a normal force that moves a component of the tensioner 10 against the arm 1 to apply frictional damping to the arm 1 such that the arm 1 can resist being moved away from the belt. FIG. 5B shows the first tensioner component 5 and the ramp bushing 3 having moved rotatably in response to a torsional force ($F_T$) where $F_T$ is equal to the friction torque applied from the damper bushing 18 by the rotation of the tensioner arm 1 into an up-ramp position 38. Alternately, as shown in FIG. 5C the first tensioner component 5 may move rotatably in response to a torsional force ($F_T$) applied by the rotation of the tensioner arm into an up-ramp position 39 while the ramp bushing 3 remains seated against the ramp features 6 of the second tensioner component 4. Then from either of the up-ramp positions 38 or 39 the first tensioner component 5 may move back to the down-ramp position once the torsional force ($F_T$) dissipates enough to allow the spring torque to move the first component down ramp-up 32.

When the first tensioner component 5 is in either of the up-ramp positions 38 or 39 there is a translational movement of the first tensioner component 5 relative to the pivot axis, which will increase the normal force applied against the tensioner arm 1 for frictional damping by pressing the first tensioner component 5 itself or a damper bushing 18 coupled to the first tensioner component 5 against the tensioner arm 1. When the wind-up condition dissipates, the torque on the arm 1 is reduced and the arm 1 no longer moves away from the belt. The torsional spring 2 can now apply a force to the arm to move the arm into the belt and back toward its normal operating condition thereagainst. As the arm moves back toward its normal operating condition, the torque on the torsional spring 2 is reduced which reduces the torque on the first tensioner component 5 such that the first tensioner component 5 will move back down the ramp-up 32 to a down-ramp position 36, as shown in FIG. 5A, to restore the torsional spring 2 to its pre-wind up state. When the first tensioner component 5 moves down the ramp-up, the normal force is reduced and ultimately the frictional force on the arm 1 is reduced and achieves the desired asymmetric damping.

The magnitude of tension provided by the tensioner arm 1 against the belt during normal operation is predominantly controlled by the torsional spring 2 which is dictated by the amount of pre-loading, spring constant, and other well-controlled characteristics of torsional springs know to those of ordinary skill in the art. The spring constant of the torsional spring 2 is controlled in order to create the rotational force experienced by the first tensioner component 5 during both normal operation and during the wind-up condition. The use of a flatwire spring 2 in the tensioner 10, as shown in FIG. 1, is advantageous because the flatwire spring has a lower torque per degree of rotation and less degrees of variation than a round wire spring. A flatwire spring also has less resonance issues than a round wire spring and the use of spring tape between the spring's coils can further reduce noise. Additionally, the flatwire spring reduces the tensioner's 10 axial height (H) for the clutch assembly 25, FIG. 2, (minimally the second tensioner component 4, first tensioner component 5, the torsional spring 2, and the damper bushing 18 and optionally including the ramp bushing 3 and pivot bushing 15), which can be advantageous in installing the tensioner in various motor configurations. While the flatwire spring provides reduced axial height (H), the width (W) of the clutch assembly may be increased, which actually provides an advantage in that the damper bushing which applies the frictional damping against the arm will have a larger surface area allowing for decreased pressure against the arm to produce the friction force resulting in less wear on the arm and the damper bushing and reduced change of the arm and damper bushing "locking" up.

The operation of the tensioner 10 and the rate or profile of asymmetric damping can be modulated by controlling several features of the tensioner using techniques known to those of ordinary skill in the art. The upper and lower ramp surfaces 7, 8 of the ramp bushing 3, the ramp features 9 of the tensioner component 5, and/or the ramp features 6 of the second tensioner component 4 may be modulated to vary the amount of frictional force generated due to application of a specific normal force. These components may be modulated by changing the characteristics of the ramp features, such as the profile, size, number, structure, and relative friction thereof, on at least one of the components having ramp features. The ramp features can have a variety of different profiles and shapes in order to modify the operation of the device and translate the rotational movement of the first tensioner component 5 into an axial movement of the damper bushing 18 into the tensioner arm 1. Additionally, the frictional properties of the interface between the ramp bushing 3 and the first tensioner component 5 and the second tensioner component 4 may be modulated. There are a number of different methods for adjusting the friction properties of surfaces including specific surface treatments and finishes, structures, and even material selection.

The ramp features may be coated or otherwise treated in order to minimize the ramp feature to ramp feature interface friction. Specific methods of achieving this goal can include coating the surface with a number of different materials including metallic, ceramic, and or plastic materials, including, but not limited to brass, aluminum, oil impregnated bronze, silicon nitride, Teflon® (polytetrafluoroethylene—PTFE), ultra high molecular weight polyethylene (UHMWP), or high density polyethylene. These materials may either form the entire ramp feature as one unit or be applied to a substrate or structural materials in order to achieve specific load bearing and friction characteristics.

Figure 6:
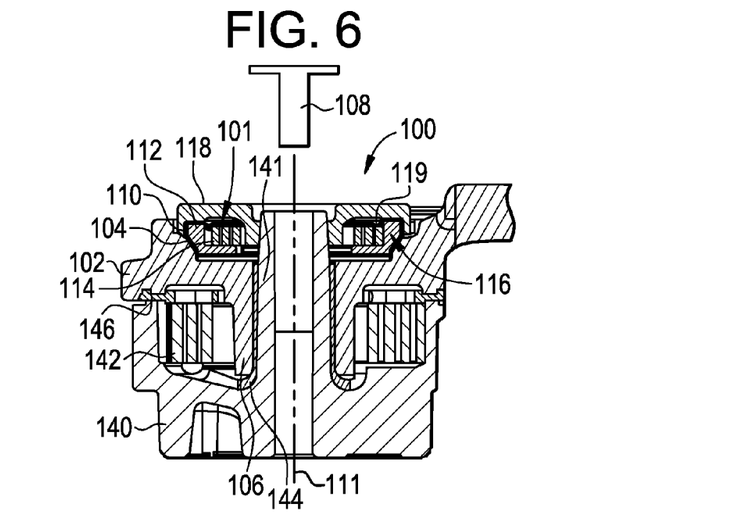
FIG. 6 is a side, cross-sectional view of a second embodiment of a tensioner having a ramp-ramp assembly.
Figure 7A:
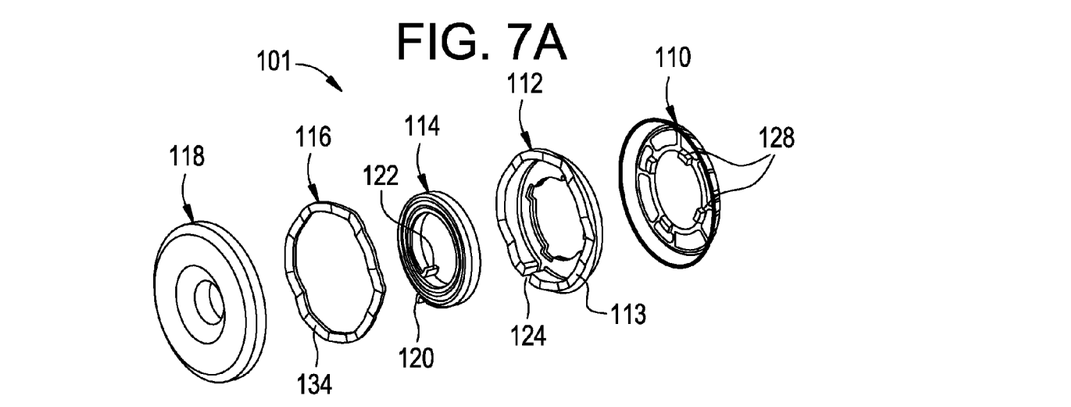
FIGS. 7A and 7B are exploded perspective views of the ramp-ramp assembly of the tensioner of FIG. 6.
Figure 7B:
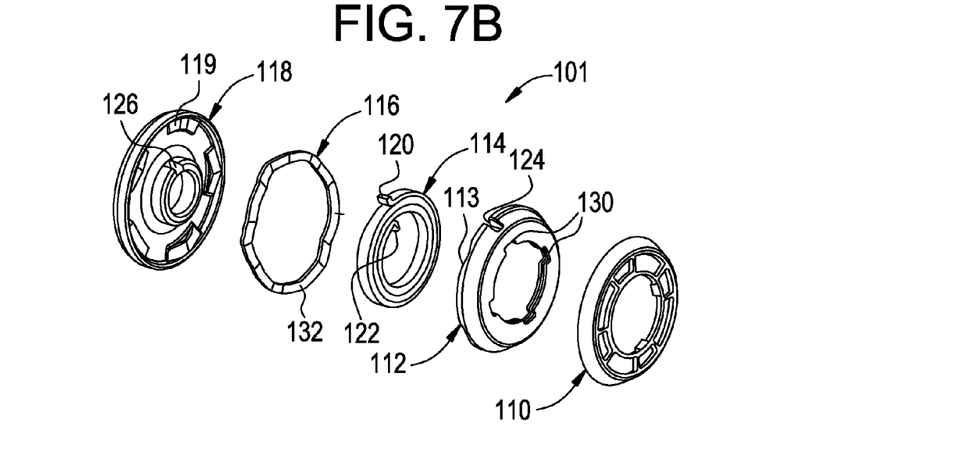

FIGS. 6 and 7A-7B depict another embodiment of a tensioner, generally designated 100, with asymmetric damping that may be adapted to support an idler pulley 22 shown in FIG. 1. The tensioner 100 includes a tensioner arm 102 that defines a cup 104 and an arm arbor 106 and is pivotable about a pivot axis 111, a spring case 140 having a spring case arbor 141 for connecting the spring case 140 to the arm 102, and a main spring 142 between the arm 102 and the spring case 140 such that the spring case houses the main spring. The main spring may be a torsional spring such as a coil spring, roundwire spring, a flatwire spring, or any other type of spring known to one of skill in the art to provide spring torque to the arm 102 to tension a belt. The main spring 142 may have a first and a second spring tang. The first spring tang may connect the main spring 142 to the arm arbor 106 and the second tang may connection the main spring 142 to the spring case 140. These connections may be similar to the connections shown in FIGS. 7A and 7B for the damper spring 114 or any other connection known to one of skill in the art. The tensioner 100 may also include a pivot bushing 144 that fits between the arm arbor 106 and the spring case arbor 141 and a spring bushing 146 positioned where the outer edge of the spring case 140 meets the arm 102 to reduce friction therebetween and facilitate the rotation of the arm relative to the spring case.

The tensioner 100 also includes a ramp-ramp assembly 101 that may be received in the cup 104. The cup 104 of the arm 102 may be recessed into the arm enough to accept at least part of the ramp-ramp assembly 101 and is shaped and sized so the ramp-ramp assembly 101 is freely rotatable within the cup 104 and about the tensioner axle 108. The ramp-ramp assembly 101 may include a damper bushing 110, a ramp hub 112, a damper spring 114, a ramp bushing 116, and an end cap 118.

The damper bushing 110 may be substantially an outward flared cone shape with an at least partially flat bottom that includes one or more tabs 128, shown in FIG. 7A, for mating the damper bushing 110 to the ramp hub 112. The ramp hub 112 may likewise have substantially outward flared cone shaped sides or a substantially cylindrical shaped sides that allow the ramp hub 112 to fit within the cone shape of the damper bushing 110. The ramp hub 112 may include hub ramp features 113, a first tang receptor 124, and one or more notches 130 spaced to receive the one or more tabs 128 of the damper bushing 110. The hub ramp features 113 may be similar to those described above in detail. One of skill in the art will appreciate that numerous ways of mating the damper bushing 110 to the ramp hub 112 are known besides a tab and notch arrangement. The exterior of the damper bushing 110 may form a friction interface with the inside of the cup 104 of the tensioner arm 102. The damper bushing 110 and the cup 104 can adopt a number of different forms including, as shown, a cup and cone shape or alternately a more cylindrical shape, ball and socket shape, or the like. The friction interface between the damper bushing 110 and the cup 104 rotatably links the movement of the ramp hub 112 through its connection to the damper bushing 110 to the rotation of the tensioner arm 102 such that rotation of the arm rotates the ramp hub 112 in the same direction about the pivot axis 111.

The ramp hub 112 may be adapted to receive the damper spring 114 therein and as such acts as a damper spring case. The damper spring 114 may be a torsional spring such as a coil spring, roundwire spring, a flatwire spring, or any other type of torsional spring known to one of skill in the art. The damper spring 114 may have a first tang 120 and a second tang 122. The first tang 120 may be received in a first tang receptor 124 of the ramp hub 112. The second tang 122 may be received in a second tang receptor 126 located in the end cap 118. The end cap 118 may also include end cap ramp features 119 for mating with the hub ramp features 113. The end cap ramp features 119 may be similar to those described in detail above.

The ramp-ramp assembly 101 may include a ramp bushing 116. The ramp bushing 116 may have a hub side having a hub ramp surface 132 and a cap side having a cap ramp surface 134. The ramp bushing 116 may be disposed between the ramp hub 112 and the end cap 118 and may be in direct contact therewith. When the ramp bushing 116 is so disposed, the hub ramp surface 132 mates with the hub ramp features 113 and the cap ramp surface 134 mates with the cap ramp features 119. The ramp bushing 116 may be both rotatable about and translatable up and down the pivot axis 111.

The end cap 118 may be substantially fixed to the tensioner axle 108 such that it does not substantially translate or rotate along or about the pivot axis 111. The end cap 119 may be fastened to the spring case arbor 141 such as by riveting, welding, bolting, adhering, or other fastening techniques known to one of skill in the art as explained above.

During normal tensioning, when a belt presses against a pulley attached to the tensioner arm 102, the arm will rotate about the pivot axis 111 thereby winding the main torsional spring 142. The main torsional spring 142 upon winding will apply spring torque against the arm 102 to move, hold, or press the arm and pulley against the belt. When the arm 102 rotates about the pivot axis 111 winding the main torsional spring 142, the frictional contact between the arm 102 and the damper bushing 110 causes the damper bushing and the ramp hub 112 connected thereto to rotate, which un-winds the damper spring 114. The wound damper spring 114 provides spring torque against the ramp hub 112 and damper bushing 110 urging the ramp hub 112 in the opposite direction as the main spring 142 thereby increasing damping, or arm resistance in one direction against the belt.

During belt tensioning when no rotation of the tensioner arm has occurred, the ramp features of the ramp hub 112, of the ramp bushing 116, and of the end cap 118 are seated in a down-ramp position relative to one another so the distance between the ramp hub 112 and the end cap 118 is minimized and likewise the frictional damping between the damper bushing 110 and the tensioner arm 102 is minimized because the damper bushing 110 is not pushing against the tensioner arm 102 with as much force (i.e., the Normal force applied to the arm is reduced).

When the tensioner arm 102 is pushed away from the belt (wind-up), the movement of the tensioner arm 102 rotates the damper bushing 110 and the ramp hub 112 and unwinds the damper spring 114. The rotation of the ramp hub 112 causes the ramp hub's ramp features 113 to move up the hub ramp surface 132 of the ramp bushing 116 or to move with the ramp bushing 116 up the ramp features 119 of the end cap 118. This may be called an up-ramp position. The movement of the ramp hub 112 up the ramp moves the ramp hub 112 and the damper bushing 110 translationally in relation to the pivot axis 111 and maximizes the distance between the ramp hub 112 and the end cap 118. The translational movement of the ramp hub 112 pushes the damper bushing 110 against the tensioner arm 102 (i.e., increasing the Normal force) for frictional damping. The movement of the ramp hub 112 up the ramp is partially dictated by the severity of the wind-up condition, the configuration of the ramp features 113 and 119 and the hub ramp surface 132 and the cap ramp surface 134, and the characteristics of the torsional spring 114. The characteristics of these components may be pre-selected to achieve desired asymmetric damping profiles relative to the wind-up conditions encountered, i.e. the profile and characteristics of the ramp features 113, 119 and of the hub and cap ramp surfaces 132, 134 of the ramp bushing 116, and the friction interfaces between the various components, using techniques as described above.

After the wind-up condition dissipates the torque, the damper spring 114 provides a spring torque to the damper bushing 110 and ramp hub 112 that moves the ramp hub 112 relative to the end cap 118 back into the down-ramp position.

When the ramp hub 112 moves down the ramp, the distance between the ramp hub 112 and the end cap 118 is again minimized or reduced. This movement reduces the force pressing the damper bushing 110 against the tensioner arm 102, which reduces the normal force applied to the friction interface therebetween to reduce the frictional damping. This second embodiment will have the same advantages as the first embodiment in relation to using a ramp bushing and a flatwire spring as shown in FIGS. 6 and 7A-7B.

The embodiments of this invention shown in the drawing and described above are exemplary of numerous embodiments that may be made within the scope of the appended claims. It is contemplated that numerous other configurations of the tensioner assemblies may be created taking advantage of the disclosed approach. In short, it is the applicant's intention that the scope of the patent issuing herefrom will be limited only by the scope of the appended claims.

What is claimed is:

1. A tensioner comprising:
a support structure having a tensioner axle that defines a pivot axis;
an arm coupled to the support structure so as to permit the arm to pivot about the tensioner axle, the arm having a lower surface that faces the support structure and an upper surface that in part defines a cup;
a damping mechanism at least partially seated in the cup of the arm, the damping mechanism comprising:
a first tensioner component being cup-shaped having first ramp features on the rim thereof, the first tensioner component engaged to the arm for rotation therewith;
a second tensioner component having second ramp features, the second tensioner component being non-rotatable about the pivot axis; and
a damper spring coupling the first tensioner component to the second tensioner component;
wherein the first ramp features are aligned with the second ramp features and rotation of the first tensioner component in a first direction moves the first ramp features relative to the second ramp features such that the first tensioner component translates into a damping engagement with the arm.

2. The tensioner of claim 1 wherein the damper spring has an inner tang and an outer tang, wherein the outer tang is coupled to the first tensioner component and the inner tang is coupled to the second tensioner component.

3. The tensioner of claim 2 wherein the damper spring is a flatwire spring.

4. The tensioner of claim 1 further comprising a damper bushing positioned between the first tensioner component and the cup of the arm, wherein the damper bushing is mated to the first tensioner component for rotation and translation therewith and is in frictional engagement with the cup.

5. The tensioner of claim 1 further comprising a torsional spring coupling the arm to the support structure.

6. The tensioner of claim 5 wherein the torsional spring is a flatwire spring.

7. The tensioner of claim 5 wherein the support structure is a spring case that houses the torsional spring.

8. The tensioner of claim 1 wherein the first ramp features and the second ramp features have geometries pre-selected to provide a desired change in frictional damping in response to the arm pivoting about the pivot axis.

9. The tensioner of claim 1 wherein the second tensioner component is an end cap enclosing the damping mechanism within the cup of the arm.

10. The tensioner of claim 1 further comprising a ramp bushing having an upper ramp surface and a lower ramp surface, the ramp bushing being disposed between the first tensioner component and the second tensioner component such that the upper ramp surface seats against the first ramp features and the lower ramp surface seats against the second ramp features.

11. The tensioner of claim 10 wherein the ramp bushing is translatable along the pivot axis and rotatable about the pivot axis.

12. A tensioner comprising:
a support structure having a tensioner axle that defines a pivot axis;
an arm coupled to the support structure so as to permit the arm to pivot about the tensioner axle, the arm having a lower surface that faces the support structure and an upper surface that in part defines a cup;
a damping mechanism at least partially seated in the cup of the arm, the damping mechanism comprising:
a first tensioner component having first ramp features, the first tensioner component engaged to the arm for rotation therewith;
a second tensioner component having second ramp features, the second tensioner component being non-rotatable about the pivot axis;
a damper spring coupling the first tensioner component to the second tensioner component; and
a damper bushing positioned between the first tensioner component and the cup of the arm, wherein the damper bushing is mated to the first tensioner component for rotation and translation therewith and is in frictional engagement with the cup;
wherein the first ramp features are aligned with the second ramp features such that rotation of the first tensioner component in a first direction moves the first ramp features relative to the second ramp features such that the first tensioner component translates relative to the second tensioner component into a damping engagement with the arm.

13. The tensioner of claim 12 wherein the damper spring is a flatwire spring.

14. The tensioner of claim 13 wherein the first tensioner component defines a spring case that houses the flatwire spring.

15. The tensioner of claim 14 wherein the first ramp features define the upper surface of the outer wall of the spring case.

16. The tensioner of claim 15 wherein the second tensioner component is an end cap enclosing the damping mechanism within the cup of the arm.

17. The tensioner of claim 16 wherein the damper spring has an inner tang and an outer tang, wherein the outer tang is coupled to the first tensioner component and the inner tang is coupled to the second tensioner component.

18. The tensioner of claim 17 further comprising a ramp bushing having an upper ramp surface and a lower ramp surface, the ramp bushing being disposed between the first tensioner component and the second tensioner component such that the upper ramp surface seats against the first ramp features and the lower ramp surface seats against the second ramp features.

19. The tensioner of claim 12 further comprising a torsional spring coupling the arm to the support structure.

20. The tensioner of claim 19 wherein the torsional spring is a flatwire spring.

* * * * *